United States Patent Office 3,541,332
Patented Nov. 17, 1970

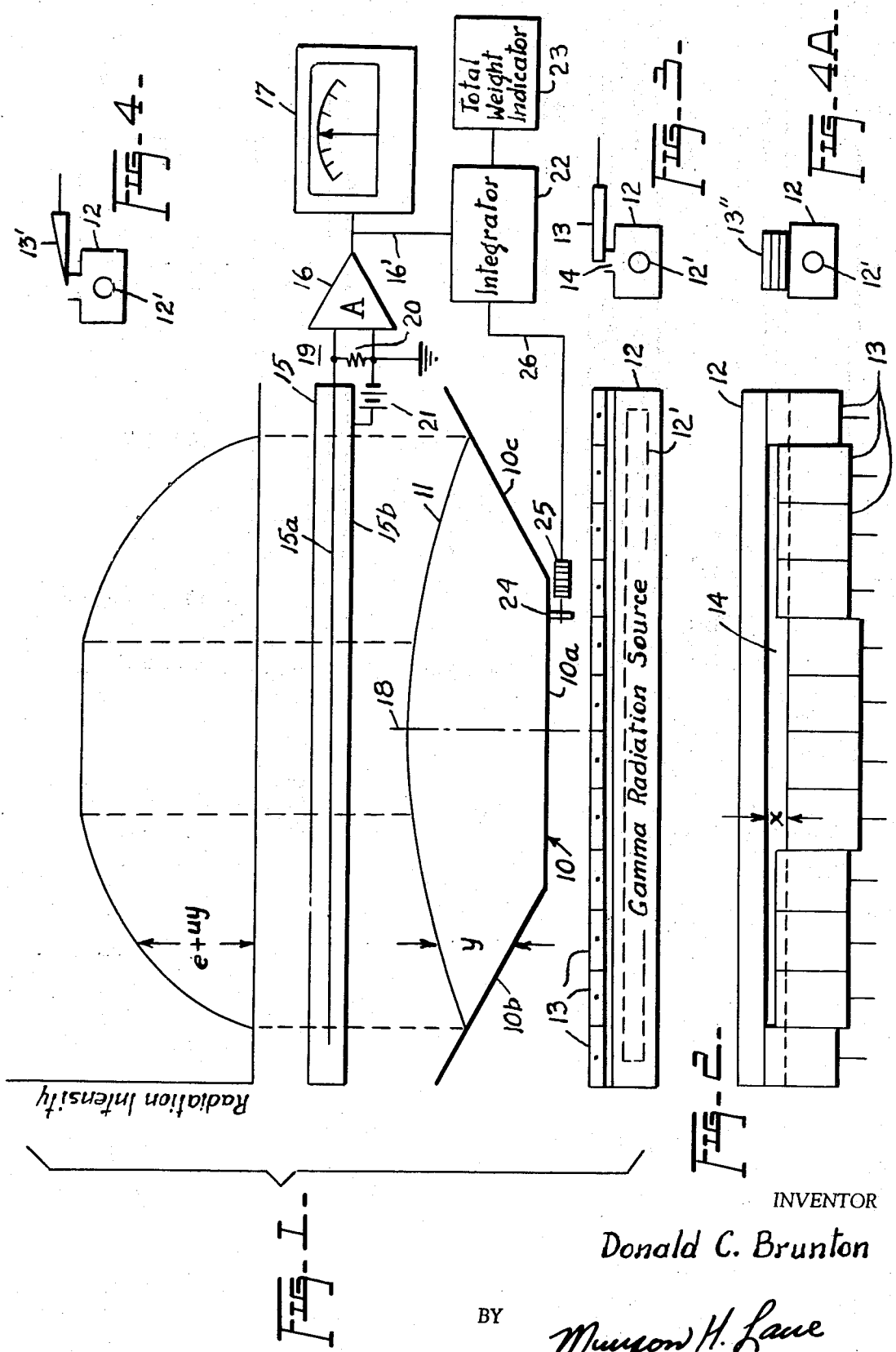

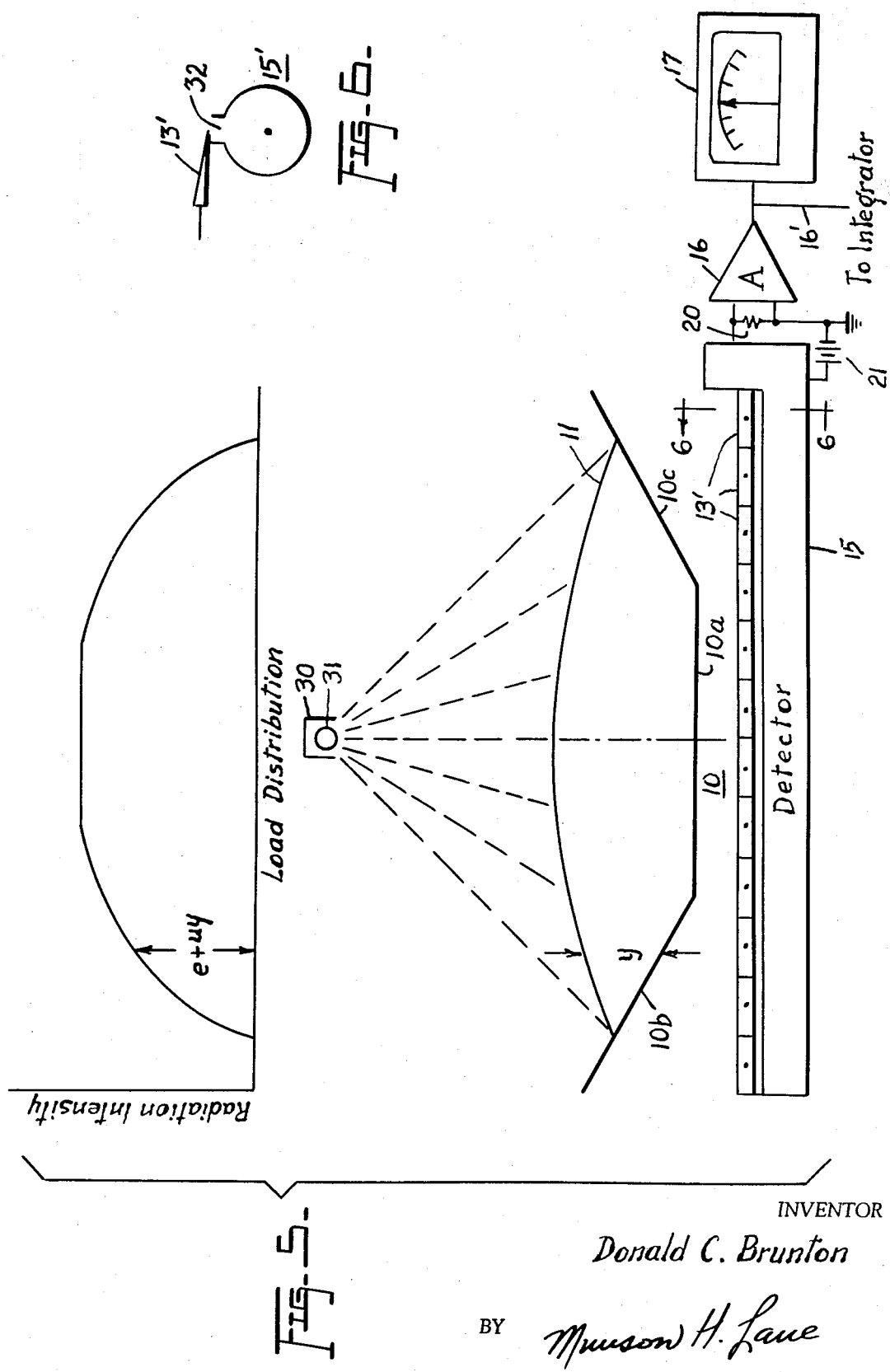

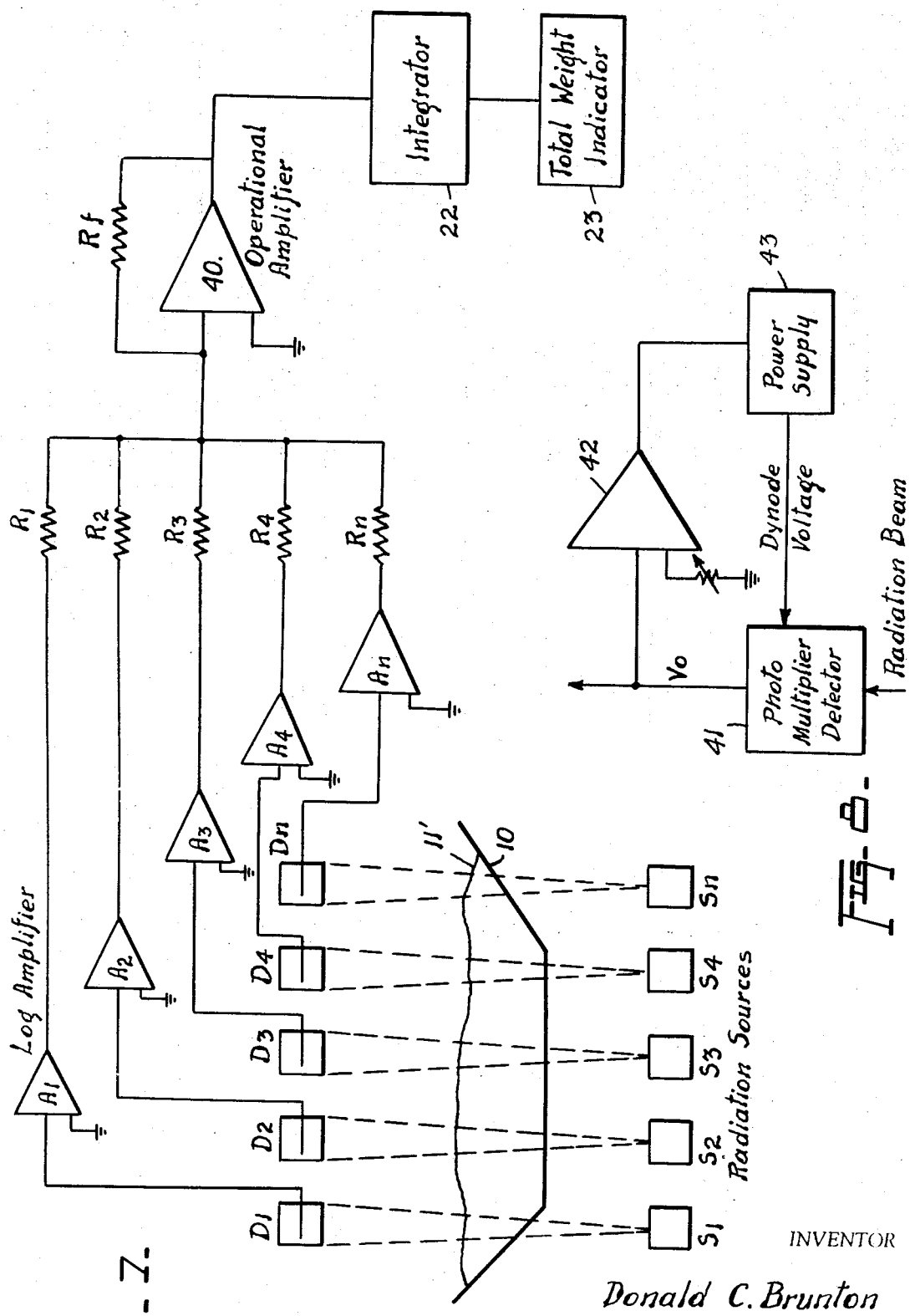

3,541,332
METHOD AND APPARATUS FOR MEASURING THE WEIGHT OF A LOAD ON A CONVEYOR BELT
Donald C. Brunton, Columbus, Ohio, assignor to Brun Sensor Systems, Inc., Columbus, Ohio, a corporation of Ohio
Filed Mar. 1, 1967, Ser. No. 619,865
Int. Cl. G01t 1/16
U.S. Cl. 250—83.3                                    30 Claims

ABSTRACT OF THE DISCLOSURE

A method and apparatus for measuring the weight of a load on a moving conveyor belt, including a radiation source for passing a band of radiations through a transverse vertical incremental section of the load, the radiations being of a nature such that they are attenuated as an exponential or similar function of the weight of the load, a detector for detecting the radiation band after it has passed through the load and producing an electrical signal which is proportional to the radiations received, a non-linear device for converting the electrical signal to an electrical output signal which is linearly proportional to the weight of an incremental section of the load, and an integrator for integrating the incremental weights over a predetermined length of the conveyor.

One specific embodiment of the apparatus stated above where the load is distributed on the conveyor so that it has a regular cross sectional form, but varies in depth longitudinally along the length of the conveyor, including the components stated above, but including in addition a sectional radiation attenuator interposed between the radiation source and the radiation detector which is adjusted to provide a radiation field across the load which conforms to the regular transverse vertical cross sectional form of the load in such a manner that the result of the attenuation by the load and the attenuator is a uniform field at the detector.

Another specific embodiment of the apparatus wherein the load is distributed on the conveyor irregularly both transversely and longitudinally, the apparatus including plural parallel radiation sources positioned transversely across the load to transmit narrow radiation bands through incremental portions of transverse, vertical incremental sections of the load, plural parallel detectors positioned on the opposite side of the load from the radiation sources to detect the narrow radiation bands and produce electrical signals proportional to the radiations received, non-linear devices associated with the detectors converting the electric signals from each detector to an electrical output signal which is linearly proportional to the weight of the incremental portion of the load through which radiations received by a particular detector pass, a summing device for electrically summing the output signals from said non-linear devices, and an integrator for integrating the sum from said summing device over a predetermined length of the conveyor.

CROSS-REFERENCES TO RELATED APPLICATIONS

Copending application of Donald C. Brunton and John M. Richter, Ser. No. 501,002, filed Oct. 22, 1965 entitled Method and Apparatus for Measuring Moisture Content in Bulk Material, assigned to Brun Corporation of Columbus, Ohio.

This invention relates to a method and apparatus for measuring or controlling the weight of irregular loads on a moving conveyor and is particularly directed to a method and apparatus of the type employing radiation gauges.

The use of gamma rays for measuring the weight of products supported on a moving conveyor belt has been known for some time.

One drawback to the use of gamma radiation gauges for measuring the load on a moving conveyor is that the radiation signals vary exponentially with the amount of material on the conveyor belt. With a heavily loaded belt this can be particularly serious. The radiation may be attenuated, for example, to one-fifth of its original value in going through the load; hence a small change of weight on a fully loaded belt would produce only one-fifth the change in signal of the same change on an empty belt.

In the case of an irregularly loaded conveyor where the depth of material on the conveyor varies substantially from point to point in the direction of movement of the conveyor, the exponential variation of radiation signals with the depth of load presents a serious problem.

It is an object of this invention to overcome the difficulty presented by the exponential radiation signal response to an irregular load which varies in depth from point to point in the direction of movement of the conveyor by subjecting the output signal from the radiation detector to a non-linear circuit which will linearize the response.

The same problem of an exponential radiation signal response arises across the conveyor when the conveyor is irregularly loaded in depth from point to point along a transverse line in the conveyor. To reduce this problem this invention provides a form and a means for shaping radiation intensity field so that equal increments of weight across the surface of the load will produce equal effects on the signal.

In the case where the transverse cross section of the load does not depart substantially from a symmetrical condition from point to point along the longitudinal center line of the conveyor surface, the radiation intensity field in this invention is shaped by providing a shutter of lead or other absorbing material which is adjustable in sections across the aperture of a distributed line radiation source, or across the aperture of a distributed line detector which is positioned perpendicular to the longitudinal center line of the conveyor surface.

Where the transverse cross section of the load is irregular from point to point along the direction of movement of the conveyor, it is an object of this invention to measure incremental loads across the conveyor by providing plural radiation sources and plural radiation detectors positioned parallelly across the conveyor.

Other objects, advantages and features of the invention will be apparent from the following description and drawings in which:

FIG. 1 is a block diagram of one form of the gamma ray weight gauge of this invention for measuring the weight of a load on a conveyor where the load is substantially symmertical in transverse cross section from point to point in the longitudinal direction of the conveyor.

FIG. 2 is a plan view of the sectional shutter for the aperture opening in the gamma radiation source housing.

FIG. 3 is a cross sectional view across the gamma radiation source housing and sectional shutter showing one shutter form.

FIG. 4 and 4a are like FIG. 3 but showing different shutter forms.

FIG. 5 is a diagrammatic view of another embodiment of the invention utilizing a point radiation source and a linear detector with adjustable shutters positioned across the detector.

FIG. 6 is a vertical cross sectional view taken on line 6—6 through the detector shown in FIG. 5.

FIG. 7 is a diagrammatic view of still another embodiment of the invention showing a plurality of radiation sources directing radiation beams vertically through an irregularly loaded conveyor (shown in vertical transverse cross section) and a plurality of detectors positioned to receive the radiation beams.

FIG. 8 is a diagrammatic view in block form showing a photomultiplier detector with negative feedback to its dynode voltage power supply which may be substituted in the place of each of the detectors and their associated amplifiers shown in FIG. 7.

Referring now to the drawings, FIG. 1 shows in transverse cross section a bulk loaded belt conveyor reach 10 having a substantially horizontal base section 10a and left and right upwardly inclined side wings 10b and 10c respectively. The angles of inclination of the wings 10b and 10c relative to the horizontal are substantially equal in accordance with usual construction of belt conveyors of this type. While the frame for supporting the conveyor has not been shown, it is to be understood that it is of a conventional construction well known in the art and usually includes horizontal roller supports for the base section 10a and inclined roller supports for the side wings 10b and 10c. The loaded conveyor reach may also be of other forms as long as it presents a substantially constant cross sectional form at the position where the thickness of the load is being measured by the radiation gauge of this invention.

The bulk load on the conveyor should also have a constant cross sectional form at the position of measurement which is substantially symmetrical about a vertical center line 18 extending through the center of width of the conveyor reach 10. While the cross sectional form of the load at the position of measurement should remain constant, it may vary in depth. It is normal for a bulk load of loose material, such as ore, tobacco, wood chips, grain, sand, gravel or the like to assume a regular cross sectional form on a conveyor of constant symmetrical cross section.

Vibration or shaking of the load on the conveyor as it moves forward tends to cause the load to assume a regular symmetrical pattern even though the depth of the load will vary from point to point in the longitudinal direction of the conveyor depending on how evenly the load is distributed to the conveyor from a hopper or other source.

The total weight of a load for a predetermined or measured length of a conveyor which is loaded as described in the preceding paragraph can be determined by measuring the incremental weight of the load as it moves past a measuring device, and integrating the incremental weight measurement over the length of the conveyor and load for which the total weight is desired.

One form of this invention as shown in FIG. 1 provides an incremental weight measuring means using a distributed line radiation source 12' positioned transversely beneath a moving loaded conveyor reach 10 and a linear radiation detector 15 mounted above the conveyor for receiving radiations transmitted from the radiation source 12' through the load 11.

The distributed line radiation source 12' may comprise an elongated cylindrical rod containing evenly distributed therein cobalt 60 or other radioactive isotopes. The radiation source selected will depend on consideration of depth of load, the radiation absorption characteristics of the load and the penetrating power of the radiation from the radiation source. In some instances, beta radiation sources or apparatus capable of producing high energy X-rays may be used as the radiation source. As shown in FIGS. 1, 2, 3 and 4, the radiation source is contained within an elongated shielded housing 12 having a collimated aperture 14 through which radiations from the source may be emitted and transmitted through the load 11. The radiation source 12' and its housing 12 are preferably positioned in a horizontal plane perpendicular to the longitudinal direction of motion of the conveyor, and are spaced out of contact with the conveyor and load. The radiation source 12' may be positioned below the load as shown in FIG. 1, or above the load if desired, without altering the effectiveness of this invention. Depending on the position of the radiation source, the radiation detector 15 will be positioned on the side of the load opposite from the radiation source and will also reside in a horizontal plane perpendicular to the longitudinal direction of motion of the load.

The linear radiation detector 15 may be of known type such as Geiger Muller tubes, ionization chambers, scintillation or crystal detectors. A preferred type of radiation detector is an elongated ionization chamber 15 of a well known type having a probe electrode 15a and a conducting wall 15b forming the other or positive electrode. The electrodes are connected in a conventional manner by circuitry 19 to an amplifier 16. A source of high DC potential indicated at 21 is impressed on the wall electrode 15b and is connected to a grounded resistor 20 which completes an external circuit with the electrode probe 15a. The lower wall of the ionization chamber 15 may be provided with suitable sealed apertures (not shown) through which radiation enters the chamber causing ionization with resulting current flow through the external circuit including the resistor 20 according to the intensity of radiation entering the chamber. The amplifier 16 is, therefore, responsive to the potential difference across the resistor 20 which is proportional to the radiation received by the detector.

In order to shape the intensity of the radiation field across the belt so that equal increments of weight across the surface of the load will produce equal effects on the signal produced by the detector 15, the radiation source housing 12 is surmounted with an aperture shield of lead or other suitable material which is adjustable in sections 13 across the belt. The shield sections 13 may be of various forms, such as those having rectangular vertical cross sections as shown in FIG. 3 or wedge-shaped cross sections as shown in FIG. 4, or simply incremental layers of absorbing material placed over the aperture as shown in FIG. 4a.

With an average load on the belt, the aperture openings are adjusted approximately so that $X = de^{+uy}$ where X is the width of the aperture opening in cm., $u$ is the absorption coefficient in cm.$^{-1}$ for the particular gamma rays and load materials and $y$ is the thickness of the load in centimeters at the particular aperture being adjusted. The symbol $d$ denotes the aperture opening for zero load thickness.

In the case of shaping the field by incremental layers of absorbing material over the source the thickness of such material is given by $$Z = \frac{\mu}{\mu_z}(y_{max} - y)$$

where $y_{max}$ is maximum load thickness, and $\mu_z$ is the absorption coefficient of the field shaping material.

Since the radiation intensity distribution across the web will not likely be uniform with a uniform aperture opening, the actual openings will be correspondingly modified. The proper procedure for aperture adjustment is to adjust each section with the belt fully loaded until a test sample moved across the load produces the same signal change at all positions.

Having shaped the radiation intensity distribution by adjusting the aperture shield sections 13 in accordance with the procedure set forth above, an incremental load change anywhere across the load as the conveyor moves forward produces an equal incremental signal change and, therefore, appears to be the same weight no matter where the incremental change occurs. This system will produce accurate results when the load cross sectional form does not depart far from a symmetrical condition at any time.

The electrical signal produced by the linear detector 15 is fed to an amplifier 16 from which an amplified signal is fed to an electrical incremental weight indicator 17 which may be calibrated to give the incremental weight of the load being measured at any instant. An integrator 22 also receiving incremental weight signals from the logarithmic amplifier 16, totalizes the weight increment over the length of the conveyor 10 which passes beneath the detector 15, and feeds an output signal proportional to total weight to a total weight indicator 23.

The length of the conveyor 10 passing beneath the detector 15 may be measured by means of a contact wheel 24 which is frictionally driven by the bottom of conveyor 10, and drives a suitable counter 25 which produces electrical output signals representing length. The electrical length signal is fed into the integrator over conductor 26.

The electrical summation integrator is of a type known in the art which is adapted to sum the incremental weight $dw/dl$ over a given length $l$.

If the conveyor is driven at a constant speed, it would not be necessary to measure the conveyor length. Instead a time signal could be fed into the integrator which would be proportional to the length of the conveyor passing beneath the detector since the distance the conveyor moves is equal to speed multiplied by the time during which it moves.

The amplifier 16 is preferably a conventional logarithmic type. The use of a logarithmic amplifier is important to linearize the output signal response of the measuring device in proportion to thickness variations of the load as the load moves beneath the detector. Since radiations passing through the load are attenuated as an exponential function of the thickness of the load on the conveyor, the electrical output signal from the linear detector 15 which is developed as a voltage signal across resistor 20 varies as an exponential function of the load thickness.

In order to obtain an output signal which is a linear function of thickness of the load, the signal output from the linear detector is applied to a logarithmic amplifier 16. One suitable logarithmic amplifier is shown and described in the copending application Ser. No. 501,002, filed Oct. 22, 1965, in the name of Donald C. Brunton and John M. Richter and assigned to Brun Corporation.

In some instances if the thickness variations of the load are small and the average thickness of the load lies at a point on the radiation attenuation versus thickness response curve for a given material where the curve is nearly linear, a linear amplifier could be substituted for the logarithmic amplifier 16. Under the condition just stated, the signal response from the detector 15 would vary in inverse proportion to the incremental weight of the load 11.

FIG. 5 shows a modified form of the invention where a point radiation source 30 is substituted for the line distributed radiation source 12', described with reference to the form of the invention shown in FIGS. 1 through 4. Also in the modified form the point radiation source 30 is positioned above and over the center of the load 11 and the linear detector 15 is positioned beneath the load. Instead of positioning the adjustable aperture shield sections over the radiation source as in FIG. 1, adjustable sections 13' are positioned over the radiation window 32 of the linear detector 15. When adjusting the shield sections 13' over the detector 15, the radiation field must be compensated for the difference in distance travelled by rays from the point source to various portions of the detector as well as for the transverse vertical cross sectional form of the load. Since the radiations are emitted from a point source, the radiation beam must have a divergent span to cover the width of the load. Thus, rays in the center of the beam will travel a less distance than the rays on the outside margins of the beam, before reaching the detector 15.

The manner of adjusting the shield section 13' in the modified form is essentially the same as the manner of adjusting the sections 13 in the form of the invention shown in FIG. 1. That is, the procedure is to adjust each section with the belt 10 fully loaded until a test sample moved across the load produces the same signal change at all positions.

The signal output from the detector 15 is fed to a logarithmic amplifier 16 which linearizes the signal response relative to the incremental load weight in the same manner as described with reference to the system shown in FIG. 1. The linearized signal from the amplifier 16 is then fed to various use devices such as the indicator 17, an integrator not shown, or to suitable control devices.

Another embodiment of the invention is shown in FIG. 7. Where the load does not have a regular transverse cross sectional distribution along the length of a moving conveyor, it is not possible to obtain accurate measurements of weight using the apparatus shown in FIGS. 1–6. The reason is that the adjustment of the field intensity for measurement of one incremental cross sectional load form would not be correct for other incremental cross sectional load forms along the length of the load.

The system shown in FIG. 7 obtains accurate weight measurements of a load distributed in any manner along a moving conveyor belt by use of a plurality of collimated radiation sources $S_1$–$S_n$ and a plurality of discrete detectors $D_1$–$D_n$ position side by side across load so as to measure incremental portions of the load transversely across the load. The detectors $D_1$–$D_n$ are preferably ionization chamber detectors similar to the detector described in connection with FIG. 1.

The electrical signals from each of the detectors $D_1$–$D_n$ are seprately linearized by an associated one of the logarithmic amplifiers $A_1$–$A_n$ to obtain an output signal from each of the amplifiers $A_1$–$A_n$ which is linear with the load thickness (or weight per unit area).

Since the output voltages $v_1$ to $v_n$ from the amplifiers $A_1$ to $A_n$ are linear with respect to thickness $y$, the average weight, $Wa$, across the belt may be expressed as:

$$Wa = K\frac{1}{n}\Sigma(v_1 + v_2 + v_3 + v_4 + \cdots v_n)$$

To obtain the sum of the incremental weights across the belt, the output voltages $v_1$, $v_2$, $v_3$, $v_4$ and $v_n$ are fed through coupling resistors $R_1$, $R_2$, $R_3$, $R_4$ and $R_n$ respectively to an analog summing amplifier 40.

The output voltage $v_o$ from the amplifier 40 may be expressed by the following equation:

$$v_o = K_1 v_1 + K_2 v_2 + \ldots K_n v_n$$

where $K_n = R_f/R_n$

The output voltage $v_o$ from the summing amplifier is then fed to an integrator 22.

The integrated weight $W_t$, delivered by the belt 10 in time, $t$, is:

$$W_t = \frac{K}{n}\int_0^t \Sigma v_o dt$$

The integrator 22 is thus set up to integrate the above equation to obtain total weight, $W_t$. An electric analogue of $W_t$ may be fed to a separate total weight indicator which may be an electric meter calibrated in units of weight.

A variation of the embodiment shown in FIG. 7 can be applied with satisfactory results. The variation involves the substitution of photomultiplier detectors for the ion chamber detectors and logarithmic amplifiers shown in FIG. 6. Instead of requiring separate linearizing amplifiers as in FIG. 7, each of the photomultiplier detectors is made to have a linear output with thickness of the load. As shown in FIG. 8, this may be accomplished in the case of a photomultiplier detector 41 by using the output signal $v_o$ as a negative feedback to the voltage supply 43 for the multiplier dynodes. An adjustable gain amplifier 42 is placed in the feedback circuit from the photomultiplier output to the dynode voltage power supply 43. The gain of the photomultiplier may be so controlled that the output of the photomultiplier is made logarithmic rather than linear with input radiation. This type of output has been applied to photomultiplier radiation detectors previously to make extremely wide range meters for radiation survey purposes. It is facilitated by the exponential response of the photomultiplier gain with dynode voltage. Because of this fact an exponential decrease in gain accomplishes an increasing input current and the result is a logarithmic output response. Now in the variation of the invention shown in FIG. 8, the feedback constant of the photomultiplier circuit is adjusted to match the absorption coefficient of the load material so that the result is a linear output. In practice, the feedback constant may be adjusted experimentally by measuring the output as the load is increased.

The net result in output voltage, $v_o$ is:

$$v_o = \log I_o e^{-\mu y} = \log I_o - \mu y$$

where $y$=thickness of load. Hence $v_o$ is linear with the load thickness.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

1. A method for measuring the weight of incremental transverse vertical sections of a bulk load on an irregularly loaded moving belt conveyor where the load has a regular transverse vertical cross sectional form throughout its length but varies in thickness along its length comprising transmitting a transverse band of penetrating radiations through the load, said radiations being of a nature such that they are attenuated as an exponential or similar function of the thickness of the material making up the load, adjusting the intensity field of the band of penetrating radiation in conformity with the transverse vertical cross sectional form of the load for creating a field of radiation which is uniform at the detector with a typical load in place, detecting the radiations of said transverse band after they have passed through the load and the intensity field thereof has been adjusted so as to produce an electrical signal which is proportional to the radiations detected, and converting said electrical signal by non-linear conversion means to produce an output signal which is proportional to the weight of said incremental transverse vertical sections of load.

2. The method set forth in claim 1 wherein said transverse band of radiations is a band of parallel rays extending across the width of the load.

3. The method set forth in claim 2 wherein said transverse band of radiations is a fan-shaped band of non-parallel rays diverging from a point and spreading out across the width of the load, and wherein the intensity field of the radiation band is adjusted both in conformity with the transverse vertical cross sectional form of the load, and the varying distance travelled by the individual rays of the radiation band.

4. The method set forth in claim 1 wherein said intensity field is adjusted by moving a test sample across the transverse spread of the radiation band after the radiation band has passed through a fully loaded conveyor and adjusting the attenuation of transverse incremental portion of the radiation band by radiation absorbing means until the test sample produces the same signal change in the detected radiations at all positions across the radiation band.

5. A method of measuring the total weight of a predetermined length of a bulk load on an irregularly loaded moving belt conveyor comprising obtaining the weight of an incremental transverse vertical section of a load in accordance with claim 1, and summing the incremental weights over said predetermined length.

6. Apparatus for measuring the weight of incremental transverse vertical sections of a bulk load on an irregularly loaded moving conveyor where the load has a regular transverse vertical cross sectional form throughout its length but varies in thickness along its length, comprising a radiation source for transmitting a transverse band of penetrating radiations through the load, said radiations being of a nature such they are attenuated as an exponential or similar function of the thickness of the material making up the load, adjusting means intercepting said transverse band for adjusting the intensity field of the band of penetrating radiations in conformity with the transverse vertical cross sectional form of the load for creating a field of radiation which is uniform at the detector with a typical load in place, a detector means positioned for detecting the radiations of said transverse band after they have passed through the load and after the intensity field thereof has been adjusted, said detector means producing an electrical signal which is proportional to the radiations received, and non-linear converting means for converting said electrical signal to produce an output signal which is proportional to the weight of said incremental transverse vertical sections of load.

7. The apparatus set forth in claim 6 wherein said radiation source is a distributed line source extending across the width of the conveyor load.

8. The apparatus set forth in claim 6 wherein said radiation source is a point source provided with means for producing a fan-shaped band of non-parallel rays diverging from said point source and spreading out across the width of the load.

9. The apparatus set forth in claim 6 wherein said adjusting means is a radiation absorbing material comprising a plurality of independently adjustable parallel solid sections arranged side by side on a common plane perpendicular to said transverse band.

10. The apparatus set forth in claim 7 wherein said radiation source is an elongated rod containing radiation emitting material together with an elongated housing encompassing said elongated rod, an elongated aperture slot in said housing facing said loaded conveyor, and wherein said adjusting means is a radiation absorbing shield comprising a plurality of independently adjustable parallel, solid sections arranged side by side in a common plane extending across said aperture slots, said sections being slidably mounted in said common plane over said aperture slots to varying extents within the limits wherein the aperture slot beneath each section is fully opened or fully closed to the emission of radiations from said source.

11. The apparatus set forth in claim 6 wherein said radiation source is a source of gamma radiations.

12. The apparatus set forth in claim 8 wherein said detector means is an elongated ionization chamber having a radiation receiving window extending the length thereof and facing said loaded conveyor, said detector means being positioned on the side of said loaded conveyor opposite from said radiation source in a plane parallel to said conveyor and spaced therefrom and further positioned so that said fan-shaped band of radiations impinge upon said window, and wherein said adjusting means is a radiation absorbing shield comprising a plurality of independently adjustable parallel solid sections arranged side by side in a common plane extending across said window, said sections being slidably mounted in said common plane over said window to varying extents within the limits wherein the window portion beneath each section is fully opened or fully closed to the transmission of radiations therethrough.

13. The apparatus set forth in claim 12 wherein said solid sections are wedge-shaped.

14. The apparatus set forth in claim 9 wherein said solid sections are solid bars of uniform thickness and having parallel opposite sides.

15. The apparatus set forth in claim 9 wherein said solid sections are wedge-shaped bars.

16. Apparatus for measuring the total weight of a predetermined length of a bulk load on an irregularly loaded moving belt conveyor comprising the apparatus set forth in claim 6 together with integrating means for summing the incremental weights over said predetermined length.

17. A method for measuring the weight of entire incremental transverse vertical sections of a bulk load on an irregularly loaded belt conveyor comprising transmitting a plurality of narrow parallel bands of penetrating radiations through small incremental portions of the entire incremental transverse vertical sections of the load, said radiations being of a nature such that they are attenuated as an exponential or similar function of the thickness of the material making up the load, separately detecting each beam of penetrating radiations after they have passed through the load so as to produce electrical signals which are a function of the radiations detected, converting each signal to produce an output signal which is linearly proportional to the weight of the small incremental portions of the load through which the detected radiation beam passes, and summing all said output signals.

18. A method for measuring the total weight of a predetermined length of a bulk load on an irregularly loaded moving belt conveyor comprising obtaining the weight of incremental transverse vertical sections of a load in accordance with claim 17, and integrating the weights of incremental transverse vertical sections over said predetermined length.

19. The method set forth in claim 17 wherein said detecting and converting steps are performed simultaneously within a detector.

20. The method set forth in claim 17 wherein said converting step is performed subsequent to said detecting step.

21. Apparatus for measuring the weight of entire incremental transverse vertical sections of a bulk load on an irregularly loaded belt conveyor comprising a plurality of parallel radiation sources positioned to transmit narrow, parallel bands of penetrating radiations through small, side by side, incremental portions of the entire transverse vertical sectionsn of the load, said radiations being of a nature such that they are attenuated as an exponential or similar function of the thickness of the material making up the load, plural parallel radiation detector means positioned on the opposite side of said load from said sources, each detector means being directed to receive the radiation beam of one of said sources after said beam has passed through said load, and each detector means being operable to produce an electrical signal which is a function of the radiations received, means for converting each signal to produce an output signal which is linearly proportional to the weight of the small incremental portions of the load through which the detected radiation beam passes, and means for summing all said output signals.

22. The apparatus set forth in claim 21 wherein said detectors are photomultiplier detectors and said converting means are combined with the detectors to cause the detector to have a logarithmic response to radiations received, which logarithmic response is a linear function of the weight of the small incremental portion of the load.

23. The apparatus set forth in claim 21 wherein said detectors have a linear response with respect to radiatioins received, and said converting means are non-linear devices for converting the electrical signals from the detectors to produce output signals which are proportional to the weight of said small side-by-said incremental portions of said load.

24. The apparatus set forth in claim 23 wherein said detectors are ion chamber detectors.

25. The apparatus set forth in claim 23 wherein said non-linear devices are longarithmic amplifiers.

26. The apparatus set forth in claim 21 together with means for integrating the weight of said entire incremental transverse sections over a predetermined length of the load.

27. The apparatus set forth in claim 26 wherein said length is a function of a constant speed and a variable time, and the integration is performed with respect to time.

28. Apparatus for measuring the total weight of a predetermined length of a load on a moving conveyor belt comprising means for passing radiations through transverse vertical incremental sections of said load, said radiations being of a nature such that they are attenuated as an exponential or similar function of the weight of the transverse incremental section of material making up the load, means for detecting said radiations after they have passed through said load and producing an electric signal which is a function of the radiations received, non-linear means for converting said electric signal to an output signal which is linearly proportional to the weight of said transverse incremental section, and means for integrating said output signal over said predetermined length.

29. A method for measuring the total weight of a predetermined length of a load on a moving conveyor comprising passing radiations through transverse vertical incermental sections of said load, said radiations being of a nature such that they are attenuated as an exponential or similar function of the weight of the transverse incremental section of material making up the load, detecting said radiations after they have passed through said load and producing an electric signal which is a function of the radiations received, converting said electric signal non-linearly to an output signal which is linearly proportional to the weight of said transverse vertical incremental section, and integrating said output signal over said predetermined length.

30. The apparatus set forth in claim 9 wherein said solid sections are solid bars whose total thickness is varied to produce the desired radiation field shape.

References Cited

UNITED STATES PATENTS

| | | | |
|---|---|---|---|
| 3,132,247 | 5/1964 | Wright | 250—83.3 |
| 3,278,747 | 10/1966 | Ohmart | 250—83.3 |
| 3,304,427 | 2/1967 | Peyser | 250—105 |
| 3,361,911 | 1/1968 | Kowalczynski | 250—83.3 |

RALPH G. NILSON, Primary Examiner

D. L. WILLIS, Assistant Examiner

U.S. Cl. X.R.

250—105